(12) United States Patent
Freeman et al.

(10) Patent No.: US 10,333,964 B1
(45) Date of Patent: Jun. 25, 2019

(54) FAKE ACCOUNT IDENTIFICATION

(71) Applicant: Microsoft Technology Licensing, LLC, Redmond, WA (US)

(72) Inventors: David Stephen Mandell Freeman, Mountain View, CA (US); Theodore Hwa, Cupertino, CA (US); Cao Xiao, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 632 days.

(21) Appl. No.: 14/726,244

(22) Filed: May 29, 2015

(51) Int. Cl.
*G06Q 50/00* (2012.01)
*H04L 29/06* (2006.01)

(52) U.S. Cl.
CPC ...... *H04L 63/1441* (2013.01); *H04L 63/1408* (2013.01)

(58) Field of Classification Search
CPC .......................... G06Q 10/00; H04L 63/1408
See application file for complete search history.

(56) References Cited

U.S. PATENT DOCUMENTS

| | | | | |
|---|---|---|---|---|
| 9,424,612 | B1* | 8/2016 | Bright | G06Q 50/01 |
| 2013/0139224 | A1* | 5/2013 | Wehmeier | G06F 21/552 |
| | | | | 726/4 |
| 2013/0185230 | A1* | 7/2013 | Zhu | G06Q 10/107 |
| | | | | 706/12 |
| 2014/0040152 | A1* | 2/2014 | Fang | G06Q 10/10 |
| | | | | 705/319 |
| 2014/0208424 | A1* | 7/2014 | Hudack | G06F 21/316 |
| | | | | 726/23 |
| 2015/0161387 | A1* | 6/2015 | Hu | G06F 21/552 |
| | | | | 726/23 |
| 2016/0094529 | A1* | 3/2016 | Mityagin | H04L 63/08 |
| | | | | 726/7 |

* cited by examiner

*Primary Examiner* — Kira Nguyen
(74) *Attorney, Agent, or Firm* — Hickman Palermo Becker Bingham LLP

(57) ABSTRACT

A method involves receiving account registrations and identifying a group of account registrations where each account registration in the group of account registrations shares attributes. The method further involves identifying features of the group of account registrations, and based on the features, determining whether to block a set of accounts that is associated with the group of account registrations.

20 Claims, 4 Drawing Sheets

| Registration Date | IP Address | Name | Email Address |
|---|---|---|---|
| 1/1/15 | 1.1.1.1 | John Doe | email123@email |
| 1/1/15 | 1.1.1.1 | James Lee | email234@email |
| 1/2/15 | 1.1.1.1 | Sarah Smith | email345@email |
| 1/2/15 | 1.1.1.1 | Jimmy John | email456@email |
| 1/2/15 | 2.2.2.2 | Dan Smith1 | dsmith1@email |
| 1/2/15 | 2.2.2.2 | Dan Smith2 | dsmith2@email |
| 1/2/15 | 2.2.2.2 | Dan Smith3 | dsmith3@email |
| 1/3/15 | 1.1.1.1 | Annie Paxson | email567@email |
| 1/3/15 | 1.1.1.1 | Jessica Pogue | email678@email |
| 1/3/15 | 3.3.3.3 | Noah Johnson | hjohnson@email |
| 1/3/15 | 3.3.3.3 | Jen Helton | jennyh@email |
| 1/3/15 | 3.3.3.3 | Ben List | BL123@email |

FAKE ACCOUNT IDENTIFICATION

TECHNICAL FIELD

The present disclosure relates generally to identifying fake accounts.

BACKGROUND

The Internet enables billions of people to communicate and exchange and/or access services, among many other activities. Accessing many services on the Internet involves logging in to the service—typically using login credentials such as a username and/or password. Generally, each user maintains his or her own account associated with each service they use. For example, a user might have an account with an email provider, another account with a payment service or bank, and still another account on a social network.

Initially, each user has to create their account by going through a registration process. The registration process may involve many different steps, and typically varies based on the type of account being created. However, this is not a perfect system—fake accounts may be created. A fake account is an account used for malicious, or otherwise unapproved, reasons. For example, some users may register multiple accounts when they are supposed to be limited to a single account. Users may register for multiple accounts for many different reasons—some reasons may even be legitimate. For example, a malicious user may register for multiple accounts so that he or she may harass another user, send spam messages, or perform other malicious activities. This is of particular relevance to accounts on social networks or other services where users may communicate with other users of the service—although the invention is not limited to social networks, and may be used with any service having accounts.

Identifying these fake accounts as fast as possible would increase the value and the quality of the service provided. Previously, solutions have involved review and/or approval of each account registration. However, that solution is impractical when popular services may receive thousands, tens of thousands, or more, registrations per day.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 shows an example in accordance with an embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for fake account identification. In one embodiment, the fake accounts are associated with a social network, or other service involving communication with other users of the service. However, embodiments may be used in many different contexts where an account is involved.

In one embodiment, account registrations are received. In the account registration process, a user may directly and indirectly provide various attributes. For example, a user may provide identifying information such as a name, age, and place of employment directly as part of the registration process, and indirectly provide an Internet Protocol (IP) address because the service is able to detect the IP address of the user. Account registrations may be examined within a time period, such as a day. Within the account registrations from the same time period, groups of account registrations sharing one or more attributes may be identified. After identifying the group(s) of account registrations, common features of each group may be identified, such as identical names or a pattern in the unique email address used for each account. Based on the identified features, a decision may be made on a group by group basis whether a group of account registrations should be blocked.

Example System Implementation

Figure 1:
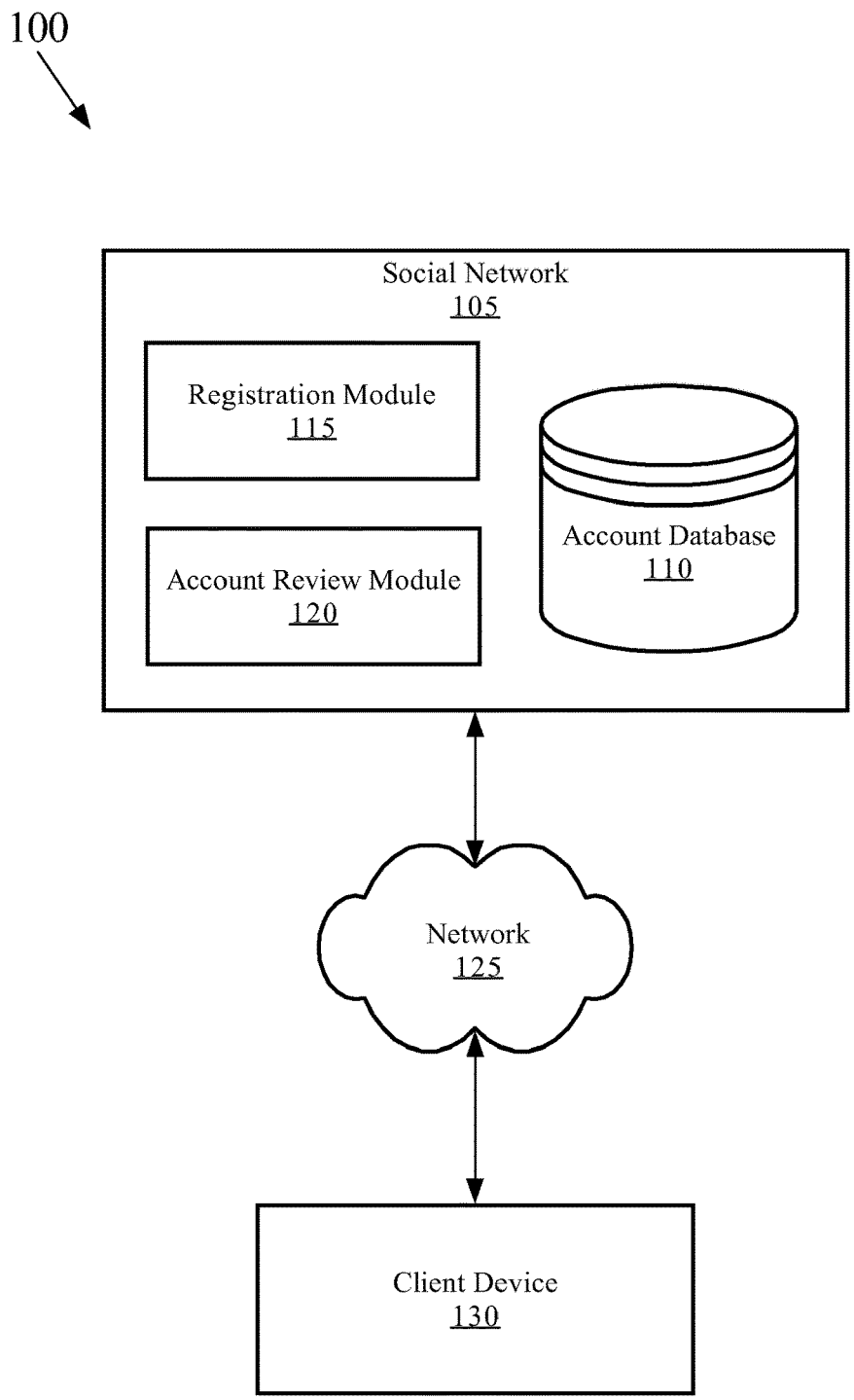
FIG. 1 shows a block diagram of a system in accordance with an embodiment of the invention.

FIG. 1 illustrates an example system 100 in which the techniques described may be practiced, according to some embodiments. System 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes social network 105, an account database 110, registration module 115, account review module 120, network 125, and client device 130. Social network 105 is a service for connecting users to other users. The connections may take many different forms. For example, connections may be unidirectional or bidirectional, and approval by one or both users may be required. Alternatively, approval may not be required. In general, social network 105 allows users to interact with other users of the social network by sending messages, posting pictures, sharing links, networking, and performing a variety of other actions. Social network 105 executes on one or more computing devices such as servers, computers, processors, database servers, and/or computing devices configured to communicate with one or more client devices 130 via network 125. The computing devices on which social network 105 executes may be located at one or more geographically distributed locations. Although social network 105 is shown in FIG. 1, the invention is not limited to social networks. The invention may be practiced with any kind of networks and/or services that maintain accounts for users.

In one embodiment, social network 105 includes an account database 110. Account database 110 is a database containing a variety of information about the accounts of users of social network 105. For example, account database 110 may include, but is not limited to: connections or connection graphs for each user and/or for various groups of users, user profiles, messages sent and/or received by users, pictures uploaded by users, and/or any other data relating to users of the social network 105. In one embodiment, the accounts stored by account database 110 include user profiles that contain user supplied identifying information including, but not limited to: a profile picture, a first name, a last name, a middle name, a work place(s), a degree(s) earned, a college or university attended, one or more groups associated with the user (i.e., a fraternity, a church, a volunteer organization, etc.), skills, and/or other data. In one embodiment, each account stored in account database 110 has gone through a registration process, such as the one described below, with regards to registration module 115. Although shown as a single database, account database 110 may be broken into multiple different databases in any number of geographic locations, with each database storing different parts of information, or any other suitable configuration.

In one embodiment, social network 105 may host many different applications, websites, modules, or components. For example, social network 105 may utilize a security module for protecting sensitive user information, an advertising module for displaying advertisements, and a suggestion module for providing suggestions of things for users to do, such as connect with new and/or existing users.

Fake Account Clustering

As shown in FIG. 1, social network 105 executes a registration module 115. Registration module 115 includes functionality for creating a new account on social network 105. In one embodiment, the account registration process may involve any number of steps. For example, registration module 115 may prompt a user to enter a variety of information, such as a username, password, first name, last name, any other information used in a user profile, etc. After the user has completed the registration process, registration module 115 may store the newly created account in account database 110. In one embodiment, during the registration process, registration module 115 may collect one or more attributes about the user/account. These attributes may not be directly provided by the user. For example, registration module 115 may collect data about the user, such as an IP address, a client identifier (such as web browser type and version, operating system type and version, and/or other information about the device used by the user, etc.). In one embodiment, these attributes are used by account review module 120 to assist in clustering and/or identifying fake accounts.

In one embodiment, social network 105 also executes an account review module 120. Account review module 120 includes functionality to identify groups of account registrations, identify common features of groups of account registrations, and determine whether to block groups of accounts. In one embodiment, account review module 120 identifies groups of accounts based on one or more attributes. The attributes may be any suitable attributes, gathered directly or in directly during the account registration process. For example, the attributes may be an IP address, a time and/or date of signup, a client identifier (such as a web browser version, operating system, cookie, and/or other identifying information), a first name, a last name, an email address, and/or other data provided by the user. Specifically, in one embodiment, account review module 120 may identify groups of accounts based on two attributes, such as IP address and a time frame. A time frame is based on a time and/or date of signup for the given account(s). The time frame may be any amount, such as a past 6 hours, a day, a week, a month, etc. Thus, for example, account review module 120 may identify groups of accounts that share an IP address and signed up for a new account on the same day. In one embodiment, account review module 120 includes functionality to filter attributes used to identify groups of accounts. For example, if an attribute is an IP address, account review module 120 may filter the IP addresses to exclude certain IP addresses, such as an IP address confirmed to be associated with a college or university, etc. Thus, even if hundreds of accounts were registered from the same IP address associated with a college, the hundreds of accounts would not be grouped. Alternatively, the filtering may be based on any other factor and performed in any suitable way.

In one embodiment, account review module 120 includes functionality to identify and group accounts over multiple time frames. For example, the invention may be performed every day using a timeframe of a day, once a week using a timeframe of a week, and on a monthly basis using a timeframe of a month. Alternatively, any combination of time frames and frequencies of review may be used. In one embodiment, account review module 120 has a minimum size threshold for grouping accounts. The minimum size threshold may be any amount, such as 3 accounts, 8 accounts, 15 accounts, etc. In one embodiment, the minimum size threshold is based on the time frame. For example, if the time frame is a day, the minimum size threshold may be 5 accounts, but if the time frame is a week, the minimum size threshold may be 14 accounts. In one embodiment, account review module 120 reviews accounts that are already "active." In other words, the accounts have had a chance to access social network 105. Alternatively, the accounts may not have had a chance to access social network 105. Alternatively still, a set of accounts that are identified as a group may include active accounts and inactive accounts.

In one embodiment, account review module 120 includes functionality to identify features of groups of accounts. The features may relate to any information relating to an individual account or group of accounts. In one embodiment, some features are only detectable when the group is viewed as a whole (such as patterns, etc.), while others are detectable when examining each account of the group individually. Account review module 120 may identify any number of features. In one embodiment, the features are broken down into different categories. Any number of categories may be used. In one embodiment, a first category is basic features. Basic features are features that are readily identifiable without a significant amount of analysis, such as how many accounts are in the group (e.g., larger groups may be more likely to be fake), each account having the same name, email, etc. For example, if each account in a group has an identical first and last name, this would weigh in favor of the group of accounts being fake.

In one embodiment, a second category is distribution features. Distribution features are features of the group such as a percentage of accounts in the group whose email addresses are invalid, or a percentage of accounts who responded to an account confirmation email, etc. In one embodiment, distribution features may take into account the relative rates in comparison to the other accounts in the social network. For example, if 0% of accounts in a group responded to an account confirmation email, when the network wide average is 60% (or even regardless of the network wide average), then this factor may weigh in favor of the group of accounts being fake.

In one embodiment, a third category is uniqueness features. Uniqueness features relate to ways to uniquely identify a user, such as a client identifier. A client identifier may identify the type and/or version of a web browser of the device used to register for an account(s) in the group, a type or version of an operating system of the device used to register for an account(s) in the group, etc. For example, since there are many different web browsers and operating systems, each with many different versions and configurations, if a group of accounts were all created by a device with an identical client identifier, this increases the likelihood of the group of accounts being fake.

In one embodiment, a fourth category is frequency features. Frequency features relate to the frequency of names, or other information, as compared to the entire social network. For example, if the last name "ABCDE" is never seen in the social network, but a group of accounts have recently registered for the social network, each with the last name of "ABCDE," then the group of accounts is likely to be fake. Conversely, if the last name "Smith" is very common within the social network, a group of accounts with the last name "Smith" may or may not be fake.

In one embodiment, a fifth category is email pattern features. Email pattern features relate to patterns in the email addresses associated with an account(s). For example, during the registration process, an email address may be required to create an account. When examining the email addresses of a group of accounts, patterns may emerge. The patterns may be any pattern including, but not limited to: a pattern of lower case letters, a pattern of uppercase letters, a pattern of numbers, etc. Thus, if a group of three accounts have emails with a pattern, such as "email1@email," "email2@email," and "email3@email," this increases the likelihood that the accounts are fake.

In one embodiment, a sixth category is name pattern features. Name pattern features relate to patterns in the name(s) associated with an account(s). For example, during the registration process, a first name and/or last name may be required to create an account. When examining the names of a group of accounts, patterns may emerge. The patterns may be any pattern including, but not limited to patterns of: periods, hyphens, spaces, dashes, numbers, letters, capital letters, lower case letters, etc. Thus, if a group of three accounts have names with a pattern, such as "A. Smith," "B. Smith, and "C. Smith," this increases the likelihood that the accounts are fake.

In one embodiment, a seventh category is null information features. Null information features relate to information in an account that was not completed, such as profile information. Null information features may be any information that was not filled in during the registration process including, but not limited to: degree(s), school(s), current workplace, former workplace(s), middle name, age, birthday, profile picture, etc. Thus, if each account in a group of accounts left blank their current workplace and college degree, this would increase the likelihood of the group of accounts being fake. Similarly, if each account in a group of accounts completed only the bare minimum requirements and added no additional information, this would increase the likelihood of the group of accounts being fake.

In one embodiment, account review module 120 includes functionality to determine whether to block a group of accounts. The determination may apply to the entire group of accounts. In other words, if the determination is made to block the group, every account in the group will be blocked. Alternatively, the determination may be made on an account by account basis.

In one embodiment, account review module 120 calculates a score for the group of accounts, based on the identified features, discussed above, that is used in the determination process. Each feature identified may increase or decrease a score for a group of accounts. Each feature may increase or decrease the score a different amount, based on how likely that feature is to indicate a fake account and/or group of fake accounts. Alternatively, each feature may increase or decrease the score a uniform amount. In one embodiment, account review module 120 determines that a group of accounts is fake and, thus, blocks the group when the score exceeds a threshold. The threshold may be any suitable amount. In one embodiment, the score represents a percentage likelihood that the accounts are fake, such as 30%, 60%, 90%, etc. In this embodiment, the threshold may be 80% likelihood that the group of accounts is fake before the determination is made to block the accounts. Alternatively, the threshold may be any other amount.

In a related embodiment, there may be multiple thresholds. For example, a first threshold may be 80%, and all groups scoring 80% (inclusive) or higher are automatically blocked. A second threshold may be from 40% (inclusive) to 80% (exclusive), and all groups falling within the second threshold may be flagged for manual review. A third threshold may be from 25% to 40% and all accounts of groups falling within the third threshold are limited in terms of what the corresponding users are allowed to do, such as send messages, post messages, comment on messages, request and view profiles, send invitations, initiate searches, look up other members of accounts using email addresses, etc. There may be any number of thresholds. In one embodiment, account review module 120 may block the group of accounts in any suitable manner. Alternatively, account review module 120 may send a notification to another module or component to block the group of accounts.

In one embodiment, account review module 120 utilizes machine learning techniques to perform one or more of the functionalities described above. Specifically, account review module 120 may utilize a supervised learning method. However, any machine learning techniques now known or later developed may be used to perform any of the functionalities of account review module 120. In one embodiment, a random forest algorithm is used in conjunction with the features discussed above to calculate the score of a group. In a random forest model, the "forest" consists of a number of decision trees built using the features discussed above. Each feature may have an associated value representing how likely, or unlikely, a group of accounts is fake based on the feature. The values used may be any number, and may differ from one decision tree to another. In a random forest, a score is generated using the many decision trees to represent the likelihood that a group of accounts is fake. In one embodiment, each decision tree votes 0 (indicating that a decision tree determined the account or group of accounts to be real) or 1 (indicating that a decision tree believes determined the account or group of accounts to be fake) during scoring. The scores from each decision tree may then be used to make a determination about whether the account or group of accounts is fake. In one embodiment, the scores may be weighted evenly. Alternatively, each decision tree may receive a different weighting based on any suitable factor.

In one embodiment, network 125 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. When network 125 comprises a public network, security features (e.g., VPN/SSL secure transport) may be included to ensure authorized access within system 100.

Client device 130 is a computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Client device 130 includes applications, software, and/or other executable instructions to facilitate various aspects of the invention described herein. Specifically, client device 130 is able to perform the steps necessary to register an account on social network 105. Client device 130 may also include additional applications or other interface capabilities to communicate with social network 105. In one embodiment, there may be any number of client devices, such as one per user of social network 105.

Example Functional Implementation

Figure 2:
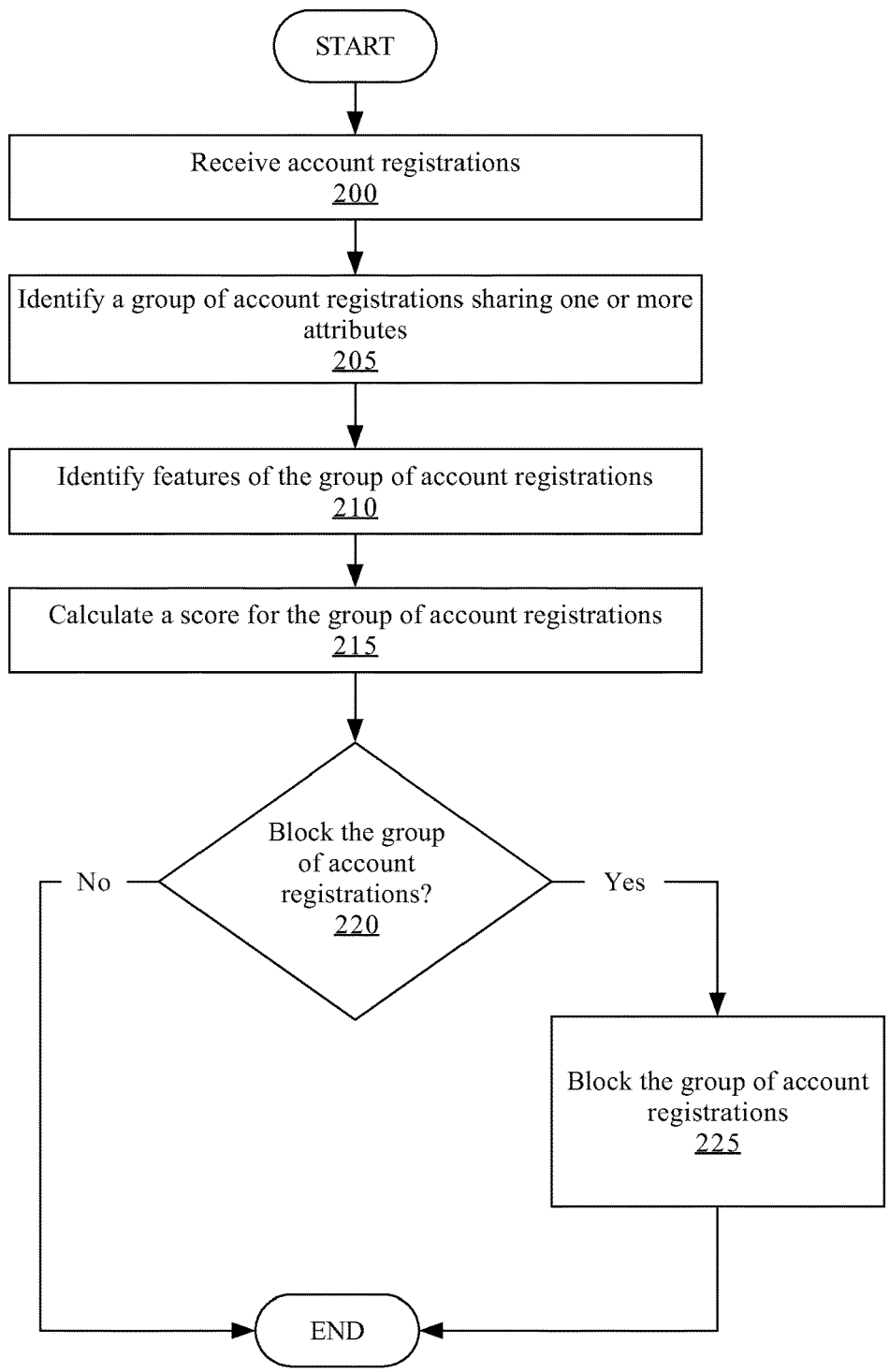
FIG. 2 shows a flowchart of a method in accordance with an embodiment of the invention.

FIG. 2 shows an example flowchart of a method for identifying fake accounts. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components.

In step 200, account registrations are received. The account registrations may be received in any manner, from any number of different devices and/or users. The account registrations may be received continuously. In one embodiment, as accounts are registered, attributes and other information about the accounts are gathered and tracked, for later uses.

In step 205, a group of account registrations sharing one or more attributes is identified. In one embodiment, the group of account registrations shares a single attribute. Alternatively, the group of account registrations shares two or more attributes. The attributes may be any attribute, either directly or indirectly provided by the user and/or device that registered for the account(s). For example, the attribute(s) may be an IP address, date of registration, client identifier, a browser identifier, first name, last name, college, workplace, other identifying information, and/or any other information known about the account and/or user of the account. In one embodiment, the group(s) of account registrations may be identified using, for example, machine learning techniques. Alternatively, any other suitable methods may be used to identify a group of accounts.

In one embodiment, there is a minimum size for a group of accounts to be identified, such as 3, 6, 10, or any other number of accounts sharing the attribute(s). In one embodiment, the minimum size varies based on the time frame which is being reviewed. For example, if a single day is being reviewed, the minimum size for a group of accounts might be 3 accounts. However, if a week is being reviewed, the minimum size for a group of accounts might be 14 accounts.

In step 210, features of the group of account registrations are identified. The features may be any identifiable features, aspects, and/or patterns recognizable when the group is reviewed individually and/or as a whole. For example, a common naming pattern may be identified, or a common email address pattern. As another example, an extremely rare name may be identified, in comparison to all other names used on the social network. Any number of different features may be reviewed to identify the common features.

In step 215, a score for the group of account registrations is calculated. In one embodiment, for each feature reviewed in step 210, a score is assigned. The score may be assigned in any suitable way. In one embodiment, a random forest model may be used to determine a score. The values used in the random forest model may be any values, and they may be weighted in any way. In one embodiment, a sum of scores from features and/or decision trees may be divided by the total number of features/decision trees used to determine a score between 0 and 1 that indicates a percentage likelihood of the group of accounts being fake. Alternatively, the score may be calculated in any other suitable way.

In step 220, a determination is made whether to block the group of account registrations. The determination may be made for the entire group of accounts together. Alternatively, the determination may be made on an individual account by account basis within the group. The determination may be based on any suitable factors. In one embodiment, the determination is made based on the score calculated in step 215. Optionally, there may be one or more thresholds and/or ranges used in the determination. For example, a first threshold may indicate that the account is "real" and will not be blocked. A second threshold may result in the accounts being flagged for further review, while a third threshold results in the accounts being blocked. Any number of thresholds and/or ranges may be used in making the determination.

In step 225, the group of account registrations is blocked. The group of accounts may be blocked in any suitable manner. In one embodiment, the blocking of the accounts is appealable by the user of the account(s), to ensure that any real accounts that are accidentally blocked are able to regain access to the social network.

Example Use Case

FIG. 3 shows an example use case. Specifically, FIG. 3 shows account signups 300 at a social network over three different days. The example shown in FIG. 3 has been greatly simplified, both in terms of attributes and features examined, as well as the ease in detecting fake accounts, to more easily show how the invention operates. For the purposes of this example, the social network uses techniques described herein on two different time frames: every day, and once every three days. The minimum size for grouping on a time frame of one day is three accounts, and the minimum size for grouping on a time frame of three days is six accounts. Additionally, groups are created based on date(s) of signup and IP address. Finally, if a group of accounts receives a score from the model indicating a high likelihood of the group being fake, the entire group will be blocked. With these parameters in mind, the account registrations may be reviewed.

The first day in this example is Jan. 1, 2015. On January 1, two accounts were registered, both to the IP address 1.1.1.1. However, this is below the minimum size, and thus no group is created. On the second day of the example, Jan. 2, 2015, five accounts are created: two to the IP address 1.1.1.1, and three to the IP address 2.2.2.2. Again, the two accounts from the IP address 1.1.1.1 do not create a group because two accounts is below the minimum size. Even though there are now four accounts created with the IP address 1.1.1.1, no group is formed, because only single days are currently being reviewed. However, the IP address 2.2.2.2 has created three accounts on the same day, which satisfies the minimum size, and therefore, a group is formed of the three accounts from the IP address 2.2.2.2.

Because a group was created, the group is processed to identify common features of the group. First, the names of the group are processed: Dan Smith1, Dan Smith2, and Dan Smith3. A pattern is easily identified: the names are the same with increasing numbers after the last name. Thus, this is a feature that increases the likelihood of this group of accounts being fake. Next, the email addresses are examined: dsmith1@email, dsmith2@email, and dsmith3@email. Similarly to the names, a pattern is easily identified: the email addresses are the first letter of the first name and the whole last name, with the same increasing numbers at the end. Thus, this is also a feature that increases the likelihood of this group of accounts being fake. Because this group of accounts has two features that increase the likelihood of the group of accounts being fake, the entire group—all three accounts—will be blocked. After the accounts are blocked, the processing of the second day of account registrations is completed.

The third day, Jan. 3, 2015, also has 5 account signups: two from 1.1.1.1, and three from 3.3.3.3. As before, the two accounts from the IP address 1.1.1.1 do not create a group because two accounts is below the minimum size. Even though there are now six accounts created with the IP address 1.1.1.1, no group is formed, because only single days are currently being reviewed. However, the IP address 3.3.3.3 has created three accounts on the same day, which satisfies the minimum size, and therefore, a group is formed of the three accounts from the IP address 3.3.3.3.

Because a group was created, the group is processed to identify common features of the group. First, the names of the group are processed: Noah Johnson, Jen Helton, and Ben List. No pattern is present in the names. Thus, this is a feature that decreases the likelihood that the accounts are fake. Next, the email addresses are processed: njohnson@email, jennyh@email, and BL123@email. No pattern is present in the email addresses. Thus, this is also a feature that decreases the likelihood that the accounts are fake. Because there is no indication that the accounts might be fake, the group of accounts is not blocked, and the users may continue accessing and/or using the social network in any manner.

Now, all three days have been reviewed individually. Next, all three days will be reviewed together. For a group to be identified over three days, there must have been six accounts created. Over the three days there were a total 12 accounts created: six by the IP address 1.1.1.1, three by the IP address 2.2.2.2, and three by the IP address 3.3.3.3. Only the IP address 1.1.1.1. meets the minimum size requirement and, thus, a single group is formed with the six accounts that were created by the IP address 1.1.1.1.

Because a group was created, the group is processed to identify common features of the group. First, the names of the group are processed: John Doe, James Lee, Sarah Smith, Jimmy John, Annie Paxson, and Jessica Pogue. No pattern is present in the names. Thus, this is a feature that decreases the likelihood that the accounts are fake. Next, the email addresses are processed: email123@email, email234@email, email345@email, email456@email, email567@email, and email678@email. There is a pattern present in the email addresses: they all follow the same form of "email" followed by three increasing numbers in order. Thus, this is a feature that increases the likelihood of the group of accounts being fake. Because there is a high likelihood that the accounts might be fake, the group of accounts—all six—are blocked, and are no longer allowed to access the social network.

Hardware Overview

Figure 4:
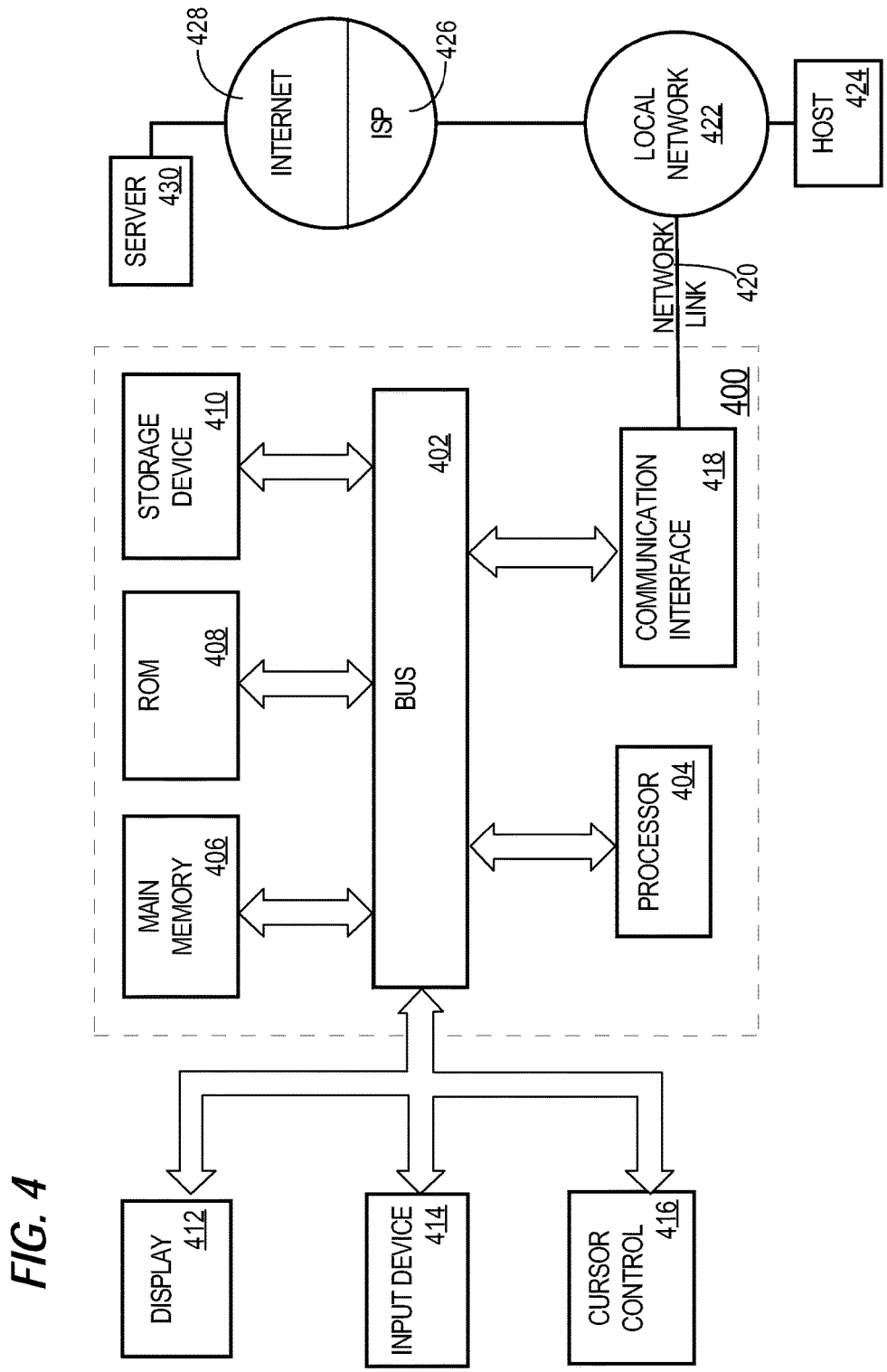
FIG. 4 shows a block diagram of a computer system upon which an embodiment of the invention may be implemented.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk or SSD, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys or touchpad for communicating direction information and command selections to processor 404 and for controlling cursor movement on display 412. This input device typically has two degrees of freedom in two axes, a first axis (e.g., x) and a second axis (e.g., y), that allow the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    using one or more machine learning techniques to train a classifier that takes, as input, a plurality of group-level feature values that correspond to a plurality of group-level features of a group of account registrations and produces a score that indicates a likelihood that the group of account registrations is malicious;
    after training the classifier using the one or more machine learning techniques, receiving a plurality of account registrations;
    identifying, within the plurality of account registrations, a particular group of account registrations, wherein the particular group comprises three or more account registrations and each account registration in the particular group of account registrations shares a plurality of attributes;
    in response to identifying the particular group of account registrations based on the plurality of attributes, identifying a second plurality of group-level feature values that correspond to the plurality of group-level features of the particular group of account registrations;

based on the second plurality of group-level feature values, determining whether to block a set of multiple accounts that is associated with the particular group of account registrations, wherein determining whether to block the set of multiple accounts comprises:

inputting the second plurality of group-level feature values into the classifier to generate a particular score, determining whether the particular score is above a threshold;

in response to determining to block the set of multiple accounts, blocking the set of multiple accounts from accessing content;

wherein the method is performed by one or more computing devices.

2. The method of claim 1, wherein the classifier comprises a plurality of decision trees.

3. The method of claim 1, wherein the plurality of attributes include (1) a time frame in which an account was registered and (2) one or more of an IP address or a client identifier.

4. The method of claim 3, wherein the time frame is a day or a particular number of days.

5. The method of claim 3, wherein identifying the particular group of account registrations comprises identifying groups of account registrations that have at least a minimum size.

6. The method of claim 5, wherein the minimum size is based on the time frame.

7. The method of claim 1, further comprising filtering one or more of the plurality of account registrations based on a whitelist.

8. The method of claim 1, wherein the plurality of group-level features includes a name pattern in a particular name field where not all values in the particular name field in the particular group of account registrations are the same, an email address pattern where not all values in an email address field in the particular group of account registrations are the same, or a null field pattern where multiple values in a particular field in the particular group of account registrations are null.

9. The method of claim 8, wherein the plurality of group-level features includes one or more of the name pattern or the null field pattern.

10. The method of claim 1, wherein the set of multiple accounts is blocked when the particular score exceeds the threshold.

11. A system comprising:
one or more processors;
one or more computer-readable media storing instructions which,
when executed by the one or more processors, cause:
using one or more machine learning techniques to train a classifier that takes, as input, a plurality of group-level feature values that correspond to a plurality of group-level features of a group of account registrations and produces a score that indicates a likelihood that the group of account registrations is malicious;

after training the classifier using the one or more machine learning techniques, receiving a plurality of account registrations;

identifying, within the plurality of account registrations, a particular group of account registrations, wherein the particular group comprises three or more account registrations and each account registration in the particular group of account registrations shares a plurality of attributes;

in response to identifying the particular group of account registrations based on the plurality of attributes, identifying a second plurality of group-level features values that correspond to the plurality of group-level features of the particular group of account registrations;

based on the second plurality of group-level feature values, determining whether to block a set of multiple accounts that is associated with the particular group of account registrations, wherein determining whether to block the set of multiple accounts comprises:

inputting the second plurality of group-level feature values into the classifier to generate a particular score, determining whether the particular score is above a threshold;

in response to determining to block the set of multiple accounts, blocking the set of multiple accounts from accessing content.

12. The system of claim 11, wherein the plurality of group-level features includes a name pattern in a particular name field where not all values in the particular name field in the particular group of account registrations are the same, an email address pattern where not all values in an email address field in the particular group of account registrations are the same, or a null field pattern where multiple values in a particular field in the particular group of account registrations are null.

13. The system of claim 11, wherein the plurality of attributes include two or more of an IP address, a time frame, or a client identifier.

14. The system of claim 13, wherein the time frame is a day or a particular number of days.

15. The system of claim 13, wherein identifying the particular group of account registrations comprises identifying groups of account registrations that have at least a minimum size.

16. The system of claim 15, wherein the minimum size is based on the time frame.

17. The system of claim 11, wherein the one or more computer-readable media storing instructions which, when executed by the one or more processors, further cause filtering one or more of the plurality of account registrations based on a whitelist.

18. The system of claim 12, wherein the plurality of group-level features includes one or more of the name pattern or the null field pattern.

19. The system of claim 11, wherein the classifier comprises a plurality of decision trees.

20. The system of claim 11, wherein the set of multiple accounts is blocked when the particular score exceeds the threshold.

* * * * *